UNITED STATES PATENT OFFICE.

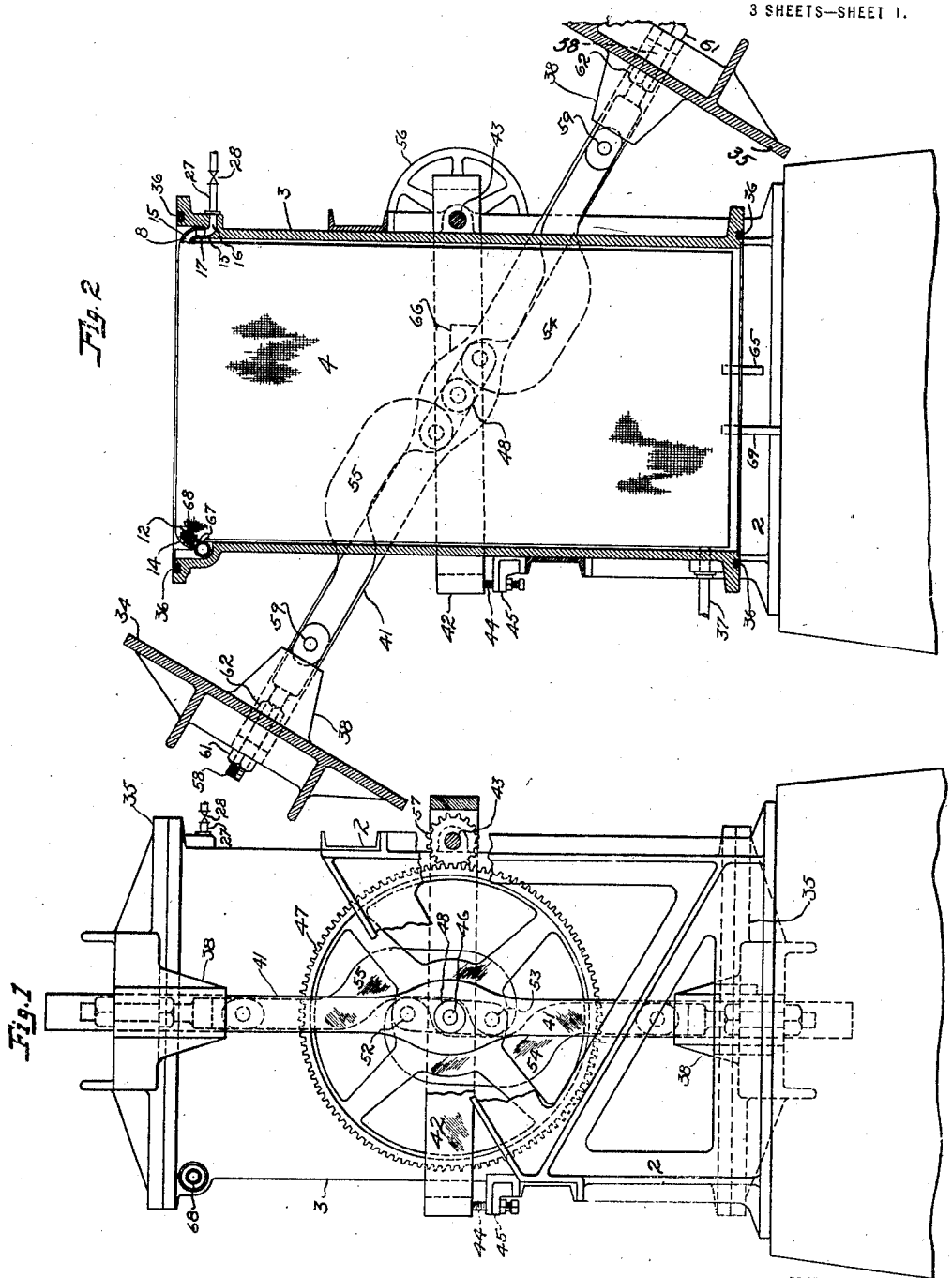

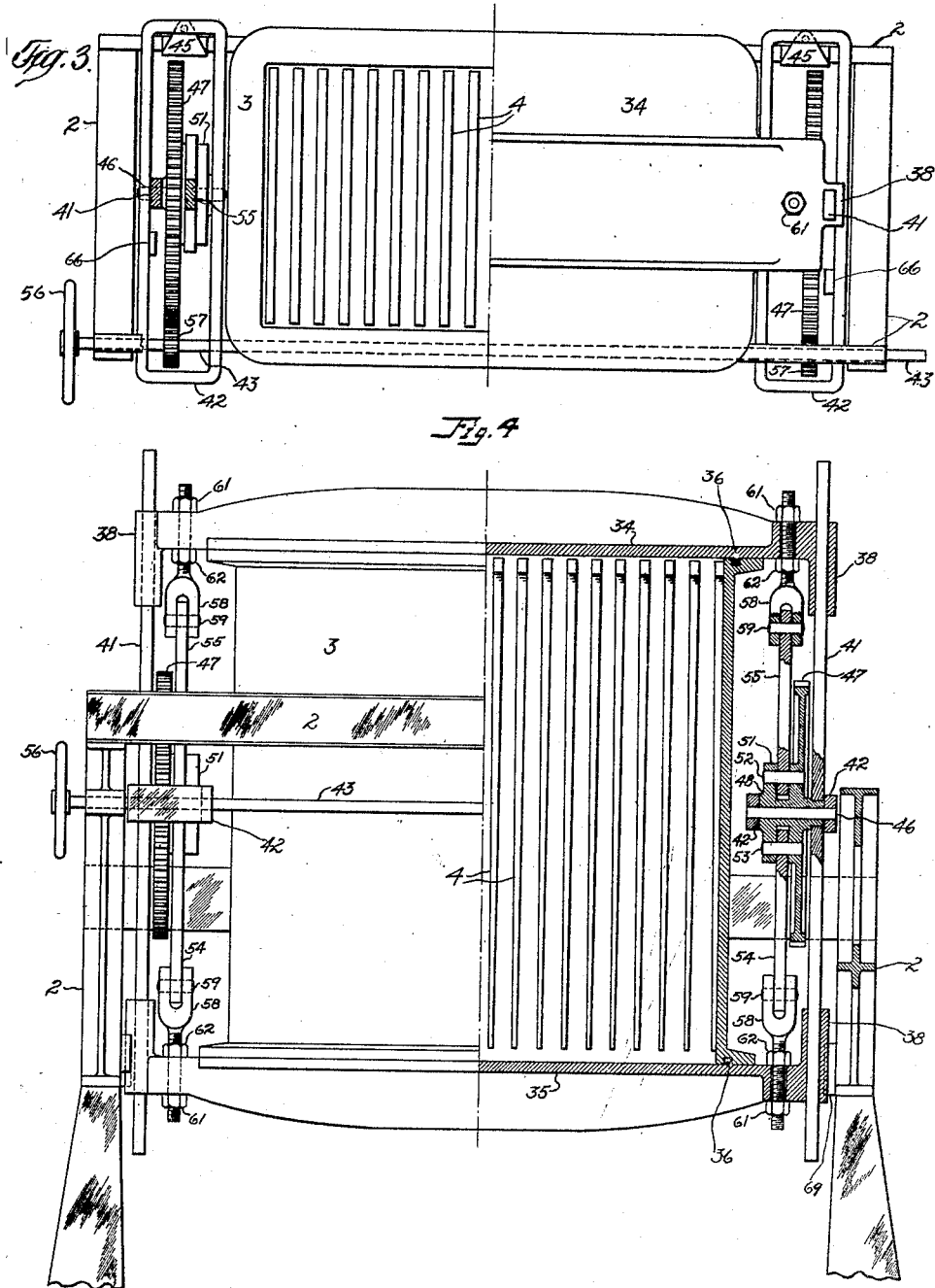

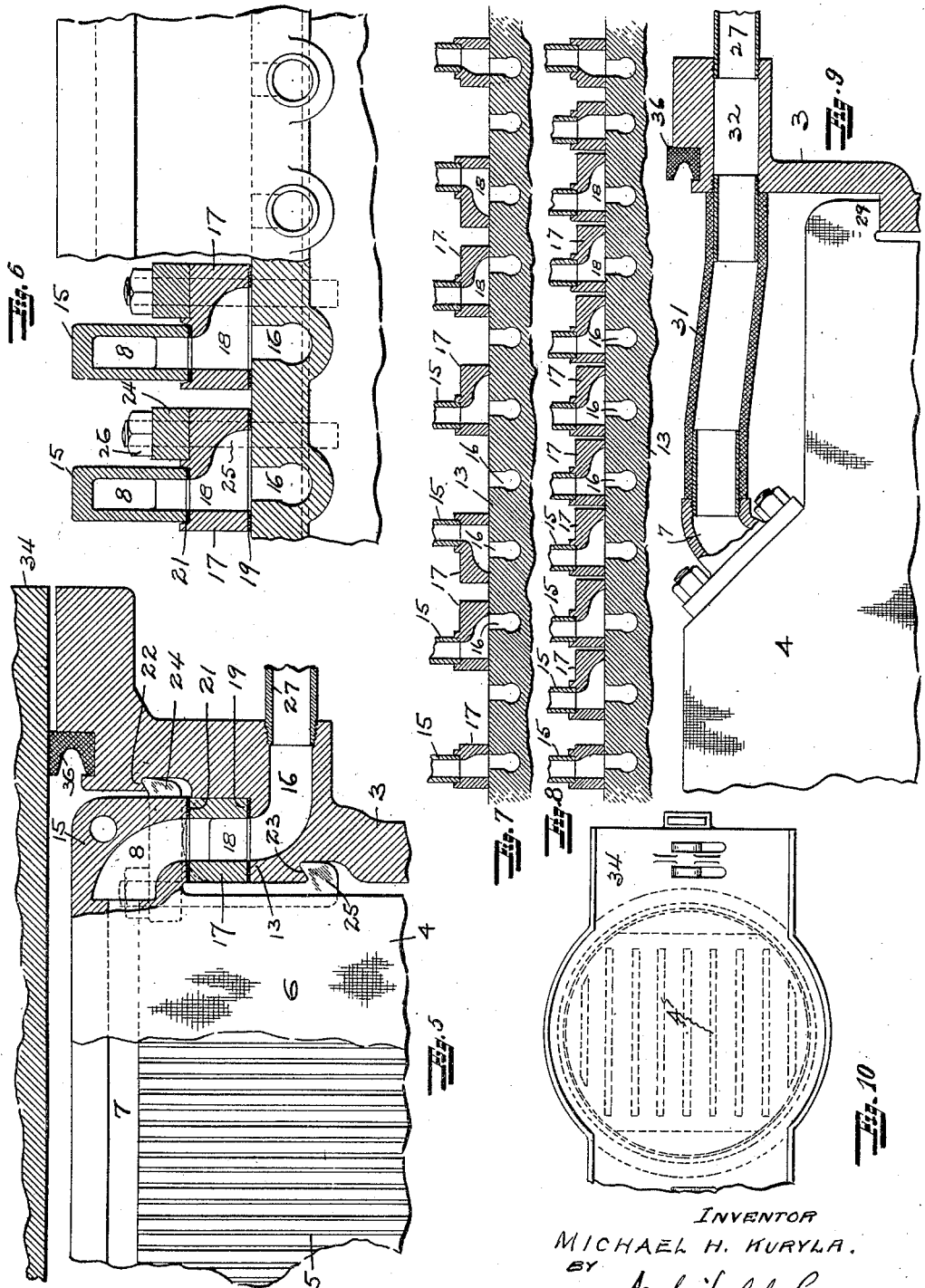

MICHAEL H. KURYLA, OF PARK CITY, UTAH, ASSIGNOR TO THE MERRILL COMPANY, OF SAN FRANCISCO, CALIFORNIA, A CORPORATION OF CALIFORNIA.

FILTERING APPARATUS.

1,345,861.  Specification of Letters Patent.  Patented July 6, 1920.

Application filed June 29, 1916. Serial No. 106,563.

*To all whom it may concern:*

Be it known that I, MICHAEL H. KURYLA, a citizen of the United States, and a resident of Park City, in the county of Summit and State of Utah, have invented certain new and useful Filtering Apparatus, of which the following is a specification.

The invention relates to an apparatus for filtering or separating solids and semi-solids from liquids or fluids containing the same.

The filter of my invention is capable of use in processes where it is desirable to separate liquids or fluids from a mixture containing the same and solid or semi-solid material and is particularly applicable to metallurgical, chemical, sugar manufacturing, and other processes, in which the unfilterable material builds up as a cake on the filter-plate.

An object of the invention is to provide a filter from which the cakes of solid or semi-solid material which have accumulated during the filtering operation may readily be discharged.

Prior to my invention, such filter-cakes have been removed by impingement of streams of water according to the process set forth in United States Patent No. 798,200, to Charles W. Merrill. This method, however, requires the use of a large quantity of wash-water, and is, consequently, not available in localities where water is scarce. It has also been suggested that the cakes be removed by back-pressure applied to the filter-cloths. With many kinds of filter-cakes, however, the use of this method alone is not satisfactory, as it leaves portions of the cake sticking to the cloths. This is highly objectionable, as it causes the subsequent filter-cakes to build up unevenly, creating uneven pressures, which frequently result in fracturing the filter-plates.

By means of the filtering apparatus which I have invented, the difficulties encountered in the prior processes are overcome. My new apparatus provides means for opening the bottom of the filter to permit the cake to fall out, while at the same time opening the top of the filter to enable the operator to see whether any portions of the cake are sticking to the plates, in combination with sluicing means which enable the operator to remove the portions of the cake which he finds sticking to the cloth with the smallest possible waste of water.

A further object of the invention is to provide mechanism for quickly opening and closing the filter and for locking the parts in the closed position. In the mechanism which I have provided for this purpose, the various operations necessary in opening, moving out of the way, returning, and locking closures for apertures in the filter-chamber are effected in proper order by the manipulation of a single operating means. The turning of a hand-wheel effects successively the loosening of closures at opposite ends of the filter-tank, the movement of said closures directly away from the tank, and the swinging of said closures out of line with the apertures which they normally close. A rotation of the hand-wheel in the reverse direction swings the closures into line with the openings, draws them in toward and against the peripheries of the openings, and locks them into water-tight contact therewith.

A further object of the invention is to provide means whereby the number and spacing of the filter-plates in the filtering chamber may be varied. By this means, I make my filter adaptable to use in connection with many different substances. If the solid matter in the mixture to be filtered is of a colloidal nature, so that it is not practicable to build up thick cakes upon the filter-plates without the use of excessive pressure, the filter-plates of my filter may be placed close together, so that the entire volume of the filter-tank may be used in the building up of thin filter-cakes. If, on the other hand, the filter is used in connection with mixtures forming cakes of a more permeable nature, the filter-plates may be spaced farther apart to allow the formation of thick filter-cakes, as is necessary for the most efficient filtration of such mixtures.

Other purposes and advantages of my invention are set forth in the detailed description of the specific form of my invention, which is illustrated in the accompanying drawings, in which—

Figure 1 is an end elevation of the filter of my invention in the closed position, parts thereof being broken away the better to disclose the construction;

Fig. 2 is a vertical cross-section of the filter of my invention in the open or discharging position;

Fig. 3 is a top view of the filter in closed position, with a portion of the upper closure plate removed.

Fig. 4 is a side elevation, partly in section, of the filter in the closed position;

Fig. 5 is a fragmentary vertical section showing the method of mounting the filter-plates in the filter-chamber;

Fig. 6 is a view, a fragmentary elevation, partly in section, taken at right angles to the section shown in Fig. 5;

Figs. 7 and 8 are longitudinal, vertical sections of the filter-plate mountings showing different filter-plate spacing;

Fig. 9 is a vertical section of a portion of the filter chamber showing a modified form of the means connecting the filtrate discharge of the filter-plates;

Fig. 10 is a top or plan view of a filter having a circular filter-chamber.

The filter of my invention comprises a suitable frame 2 supporting the filtering chamber 3, which is preferably made of metal, suitably ribbed to impart the necessary strength when filtering is accomplished by producing pressure within the chamber. Arranged in the chamber 3 are a plurality of vertically disposed filter plates or leaves 4 into which the filtrate passes and upon which the unfilterable material deposits in the form of cakes. The plates 4 are spaced apart slightly from the walls of the chamber to permit the material to be filtered to pass to all parts of the chamber and into contact with all of the plates. The filter plates may be of any desirable construction and in the present embodiment consist of vertically grooved cast-iron plates 5, covered on opposite sides with a suitable filtering medium 6, such as canvas (see Fig. 5). The filtrate passes through the filtering medium into the grooves in the plates and flows along the grooves to the channel 7, whence it flows through the filtrate outlets 8 of the filter-plates to the pipes 27, which enter the side wall of the filtering chamber near one of its upper corners (Fig. 5, Fig. 2). At the other upper corner of the filtering chamber is the rotatable sluicing-pipe 68, entering the end walls of the chamber and having nozzles 67 between the filter-plates (Figs. 1, 2).

The filtering chamber is so constructed that it may be entirely opened at the bottom to permit the free discharge of the cakes and at the top so that the discharge may be observed and the dislodgment of the cakes from the filter-plates completed by the sluicing means whenever necessary. The walls of the filtering chamber are substantially vertical, and during the filtering operation the chamber is tightly closed by the top and bottom closure-plates 34, 35, which are suitably reinforced to produce the necessary strength. The joints between the closures and the walls of the filtering chamber are sealed by gaskets 36 seated in grooves in the filter chamber. The material to be filtered is preferably introduced into the closed chamber under pressure through the pipe 37 (Fig. 2) and filtration may be accomplished by this pressure.

The means which I provide for quickly opening the chamber at the top and bottom and moving the closures to the side of the openings when it is desired to discharge the cake and quickly to aline the closures with the openings and seat and lock them thereon after the cake has been discharged are shown in Figs. 1–4. Arranged at each end of the filter is a bar 41, which, when the filter is closed, is vertically disposed. Each of the closure plates 34, 35 is provided at its ends with elongated guides 38 through which the bars extend, the closures being arranged to slide on the bars and the bars serving to hold the closures alined. The bars are rotatably mounted at their centers, so that they may swing to allow the closures to be swung out of alinement with the openings in the filter chamber. Arranged at each end of the filter is a frame 42, pivoted at one end on the horizontal shaft 43, which is journaled in the filter frame, the opposite ends of the frames 42 being capable of vertical movement, which movement is limited in the downward direction by a set-screw 44, which is attached to an abutment 45, on each end of the filter frame (Figs. 1–3). This construction allows the frame to rock slightly about their pivot for reasons which will be set forth hereinafter.

Journaled in each frame 42 at the center is a shaft 46, upon which is mounted a gear 47, which is provided with a flanged hub 48. The bar 41 is journaled on the hub 48, and the friction between the hub and the bar tends to cause the bar to move with the hub. Rotation of the gear causes the bar to swing to move the closures 34 and 35 out of or into alinement with the openings in the filter chamber. Arranged in the flanges 51 of the hub, at diametrically opposite points, are shafts 52, 53, to which are attached links 54, 55, which are attached at their other ends to the closures 35 and 34, respectively. The links are bent so that they pass around the hub and when the filter chamber is closed, as shown in Fig. 1, the shaft 53, to which the links 55 of the upper closure 34 are attached, lies below the shaft 46, and shaft 52, to which the links 54 of the lower closure 35, are attached lies below the shaft 46. Rotation of the gear wheel 47, Fig. 1, in a counter-clockwise direction will cause shaft 52 to move downward and shaft 53 to move upward, lowering and raising, respectively, the closures 35 and 34. The gears 47 are rotated by the hand-wheel 56, secured to the shaft 43, to which shaft are secured pinions 57 meshing with the gears. The links 54 and 55 are bent to allow the shafts 52 and 53 to pass vertical alinement or dead center as the filter chamber is being closed, thereby positively locking the closures to the chamber. After passing dead center, the links contact with the hub 48, which prevents their further rotation.

By virtue of the fact that the hub 48 to which the links are attached is mounted in a vertically movable frame, the hub may move vertically to equalize the pressure on the top and bottom closures and to compensate for any small differences in link length. By employing an equalizing means, both closures are tightly and evenly pressed to their seats and an unequal link length will not prevent the proper seating of the closures.

The links 54, 55 are attached at their outer ends to eye-bolts 58 by means of pins 59. The outer ends or threaded portions of the eye-bolts 58 are disposed in the closures 34 and 35. Arranged on the outer and inner face of the closures and attached to the threaded portion of eye-bolts 58 are nuts 61 and 62, respectively. By the adjustment of these nuts on the eye-bolts 58, the effective length of the link is varied.

Means are provided for restraining the movement of the closures during the opening of the filter to a vertical movement until the closures have moved a sufficient distance from the filter chamber to permit them to clear the chamber walls as they are swung to the sides thereof. Formed on each end of the frame 2, below the filter chamber and to one side of the center line thereof is an abutment 65 (Fig. 2), which, when the filter is closed, is engaged by the side of the guide 38, which for this purpose projects beyond the operative face of the closure. The abutment lies on that side of the guide toward which the closure moves as it is swung from alinement with the chamber. When the closure has been moved vertically away from the chamber a sufficient distance to allow it to clear the chamber as it swings, the guide 38 has been moved out of contact with the abutment 65 and the frictional pull on the bar 41, due to the rotation of the gear 47, causes the bar to swing on its axis and carry the closures laterally, clear of the openings in the chamber. An abutment 66 (Figs. 2, 3) on the frame 42 stops the swinging movement of the closures by contacting with the bar 41.

The filter chamber is then completely open at the top and bottom, so that the cake may freely drop from the chamber and its discharge from the filter-plates may be observed. The cakes may be loosened from the filter-plates by a reverse flow of air or liquid or air and liquid through the pipe 27. The dislodgment of any patches of the cakes which are seen to remain adhering to the filter cloths may then be effected by streams of water discharged through the nozzles 67 of the rotatable pipe 68. The nozzles direct the streams of water forcibly alongside the surface of the filter-plates, and the water causes the cake to loosen from the plate and fall. The pipe 68 is rotatable, so that the streams may be directed to any part of the filter-plates. In order to assist the discharge of the cake, the filter-plates are tapered toward the bottom, thereby providing a space of increasing width through which the cakes fall from the filter-plates and the lower part of the cake does not block the passage between the plates. The inclination of the surface of the plates also assists in dislodging the cake from the plates.

After the cakes have been discharged, the gear 47 is rotated in the opposite direction and the closures are moved back into alinement with the filter chamber, being halted in the alined position by abutments 69 (Figs. 2, 4) on the frame with which the guides 38 contact. The abutment 69 is placed lower than the abutment 65 and the guide 38 passes abutment 65 and strikes abutment 69. The frictional contact between the gears 47 and the bars 41 causes the bars to swing with the gears until the movement of the gears draws the closures in against the chamber and locks them in position. The frictional contact prevents the closures from being drawn together by the rotation of the gear until after they have passed the sides of the chamber and are in position to be seated.

In the drawing I have shown a rectangular filter chamber, but the invention is applicable to filter chambers of any shape, such as the circular filter chamber shown in Fig. 10. In this construction the closure plates are made to conform to the shape of the chamber.

The means by which I provide for varying the position of the filter-plates are shown in Figs. 5, 9. The filtering chamber is provided on opposite sides with internal shoulders 12, 13 upon which the filtering plates are supported, and the filter-plates are provided with ears 14, 15 which rest on said shoulders (Figs. 2, 5). The discharge channel 8 extends through the ear 15 and opens on the under side thereof. The wall of the chamber is provided with a plurality of filtrate discharge channels 16 which open upward on the shoulder 13. Tapped into each passage 16 is a pipe 27 through which the filtrate discharges and through which a counter-pressure is introduced by means of air or water for dislodging the cakes from the filter-plate at the end of the filtering operation. Each pipe 27 is provided with a valve 28, so that the pipe may be closed when the channel 16, with which it communicates, is not in communication with a filter-plate.

The discharge channels 16 are regularly spaced along the shoulder and are connected to the channels 8 in the filter-plates. In order that the spacing of the filter-plates in the chamber may be varied and the connection between the filtrate outlet channels and the filter-plates may be maintained, I have provided a plurality of seat blocks 17, which are interposed between the shoulder 13 and the ears 15. Each seat block is provided with a passage 18, which registers at its upper end with the passage 18 in the filter-plate, and which is broadened at its lower end, so that it spans a distance on the shoulder 13 greater than the diameter of the channel 16. The seat blocks may, therefore, be shifted on the shoulder to vary the spacing of the filter-plates while maintaining communication between the filter-plate and the discharge channel 16. In Figs. 7 and 8, I have shown two different spacings of the filter-plates, which are accomplished by different arrangements of the seat blocks. When the filter-plates are spaced apart, as shown in Fig. 7, some of the channels 16 are not connected to plates.

Arranged between the shoulder 13 and the seat block 17 is a packing ring 19, and between the seat block and the ear 15 is a second packing ring 21. The seat blocks are held firmly in place by clamps which engage the wall of the chamber. In the present instance, the wall is provided above the seat block with an undercut shoulder 22, and below the seat block with another undercut shoulder 23. Engaging under the shoulder 22 and bearing against the convex upper surface of the seat block is a clamp 24, through the end of which passes the bolt 25, which engages under the shoulder 23. By tightening the nut 26 on the bolt, the seat block is pressed and held firmly in position and by virtue of the convex bearing surface of the block, the pressure is exerted substantially downwardly. The packing ring 21 is seated in a depression in the seat block and the ear 15 extends into the depression, the weight of the filter-plate being great enough to form a tight joint between the ear and the seat block. The filter-plates are, therefore, unattached and by suitable mechanism may be readily lifted from the filtering chamber when desired. Ordinarily, however, the filter-plates are not removed except for the purpose of repair or to change the spacing of the plates. In filtering some materials, it is possible to build a thicker cake than with others, and the spacing of the filter-plates is arranged accordingly.

A modified form of filtrate discharge is shown in Fig. 9, in which the filter-plate 4 is suspended on the ears 29. The channel 7 in the filter-plate is connected by a flexible connection 31 with a channel 32 extending through the chamber wall and into which the discharge pipe 27 is screwed.

When the spacing of the filter-plates is changed, the spacing of the nozzles 67 on the sluicing-pipe 68 is correspondingly changed. This may be done by substituting a new sluicing-pipe having its nozzles spaced to correspond with the new position of the filter-plates, or the pipe 68 may be provided with several series of differently spaced holes in which the nozzles 67 may be fastened. In this case, the series of holes which are not occupied by the nozzles at any time are kept plugged.

My invention is by no means confined to the particular form of apparatus which I have illustrated and described. This apparatus is merely one concrete embodiment of my invention and may be changed in form and detail without departing from the spirit of my invention.

I claim:—

1. In a filtering apparatus comprising a chamber open at its top and at its bottom and filtering elements in said chamber, the combination of closures for the top and bottom of the chamber, means for seating the closures on the chamber, and means for equalizing the pressure of the closures on the chamber.

2. A filtering apparatus, comprising a chamber, filtering elements arranged in the chamber, removable closures for the top and bottom of said chamber, means for removing the closures from the chamber, and means for holding the closures parallel to each other, said removing means coöperating with said holding means to shift the closures to the side of the chamber.

3. A filtering apparatus, comprising a chamber having a removable bottom, tapering vertical filter-plates in said chamber having their greatest thickness at their upper edges and their least thickness at their lower edges.

4. A filtering apparatus comprising a chamber, a shoulder formed along the side of said chamber, said shoulder being provided with a plurality of discharge passages, a plurality of filter-plates arranged in said chamber provided with hollow ears engaging said shoulder and registering with the passages therein.

5. A filtering apparatus, comprising a chamber, a shoulder formed along the side of the chamber adjacent its upper edge, said shoulder being provided with a plurality of discharge passages, a plurality of filter-plates arranged in the chamber provided with hollow ears engaging the shoulder and registering with the passages therein.

6. A filtering apparatus, comprising a chamber, a shoulder formed along the side of the chamber adjacent its upper edge, said shoulder being provided with a plurality of discharge passages, seat blocks seated on said shoulder and communicating with said passages, and filter-plates supported on said seat blocks and in communication therewith.

7. A filtering apparatus, comprising a chamber, a shoulder formed along the side of the chamber adjacent its upper edge, said shoulder being provided with a plurality of discharge passages, a plurality of filter-plates supported on said shoulder and in communication with said passages, and adjustable connections between the filter-plates and the passages.

8. A filtering apparatus, comprising a chamber, a shoulder formed along the side of the chamber adjacent its upper edge, said shoulder being provided with a plurality of discharge passages, a plurality of adjustable connections seated on said shoulder and communicating with said passages, means for clamping the adjustable connections in position, and filter-plates seated on and in communication with said connections.

MICHAEL H. KURYLA.